US010496922B1

(12) United States Patent
Dockendorf et al.

(10) Patent No.: US 10,496,922 B1
(45) Date of Patent: Dec. 3, 2019

(54) PLASTIC NEURAL NETWORKS

(71) Applicant: HRL Laboratories, LLC, Malibu, CA (US)

(72) Inventors: Karl P. Dockendorf, Jacksonville, FL (US); Charles E. Martin, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 698 days.

(21) Appl. No.: 15/153,575

(22) Filed: May 12, 2016

Related U.S. Application Data

(60) Provisional application No. 62/162,032, filed on May 15, 2015.

(51) Int. Cl.
*G06N 3/08* (2006.01)
*G06N 3/04* (2006.01)

(52) U.S. Cl.
CPC ............... *G06N 3/08* (2013.01); *G06N 3/04* (2013.01)

(58) Field of Classification Search
CPC ................................. G06N 3/08; G06N 3/04
See application file for complete search history.

(56) References Cited

U.S. PATENT DOCUMENTS

| | | | | |
|---|---|---|---|---|
| 2010/0184011 A1* | 7/2010 | Comerford | ............. | G10L 15/26 434/321 |
| 2013/0325777 A1* | 12/2013 | Petre | ...................... | G06N 3/049 706/26 |
| 2015/0032449 A1* | 1/2015 | Sainath | ................... | G10L 15/16 704/235 |

OTHER PUBLICATIONS

Long, An Adaptive Spiking Neural Network with Hebbian Learning, 2011, IEEE (Year: 2011).*
Smith et al, Neural Network Models to Anticipate Failures of Airport Ground Transportation Vehicle Doors, 2010, IEEE (Year: 2010).*
Turrigiano et al, Hebb and homeostasis in neuronal plasticity, 2000, Elsevier science (Year: 2000).*
Carvalho, M. and Ludermir, T. (2007). Particle swarm optimization of neural network architectures and weights. In Proceedings of the 7th international conference on hybrid intelligent systems (HIS '07), pp. 336-339. New York: IEEE.

(Continued)

*Primary Examiner* — Austin Hicks
(74) *Attorney, Agent, or Firm* — Tope-McKay & Associates

(57) ABSTRACT

Described is a system for adapting neural networks. The system receives inputs to be learned by a multi-layered spiking neural network. A first mechanism is implemented to adapt weights on the connections via competition among neurons using Hebbian learning. Activity levels of the neurons are stabilized to allow the multi-layered spiking neural network to learn the inputs. A second mechanism is implemented to increase a learning rate of a neuron over time using Hebbian learning. A third mechanism is implemented, wherein newly created neurons, representing new inputs, copy at least one synaptic structure of older neurons in the multi-layered spiking neural network. The mechanisms are used for continuous, online learning of the inputs to the multi-layered spiking neural network. An autonomous system, such as an autonomous vehicle, can use the learned inputs to learn from its environment and perform tasks, such as classification and prediction.

12 Claims, 8 Drawing Sheets

(56) References Cited

OTHER PUBLICATIONS

Islam M., Sattar, A., Amin, F., et al. (2009), A new adaptive merging and graving algorithm for designing artificial neural networks. IEEE Transactions On Systems, Man, and Cybernetics—Part B: Cybernetics, vol. 39, No. 3, pp. 705-722.

Fahlman, S. and Lebiere, C. (1990). The cascade-correlation learning architecture. In D. S. Touretzky (Ed.), Advances in neural information processing systems II, San Francisco, CA: Morgan Kaufmann, pp. 524-532.

Frean, M. (1990), The upstart algorithm: A method for constructing and training feedforward neural networks. Neural Computation, 2, pp. 198-209.

Gruau, F. (1993). Genetic synthesis of modular neural networks. In S. Forest (Ed.), Proceedings of the 5th international conference on genetic algorithms (ICGA '93), pp. 318-325, San Francisco, CA: Morgan Kaufmann.

Hassibi, B., Stork, D. and Wolff, G. (1993). Optimal brain surgeon and general network pruning. In Proceedings of the IEEE international conference on neural networks (ICNN '93), vol. 1, pp. 293-299, New York: IEEE.

Kiranyaz, S., Ince, T., Yildirim, A. and Gabbouj, M. (2009). Evolutionary artificial neural networks by multi-dimensional particle swarm optimization. Neural Networks, 22, pp. 1448-1462.

Kitano, H. (1990). Designing neural networks using genetic algorithms with graph generation system. Complex Systems, 4, pp. 461-476.

Marchand, M., Golea, M. and Rujan, P. (1990). A convergence theorem for sequential learning in two-layer perceptrons. Europhysics Letters, 11(6), pp. 487-492.

Zhang, C. and Shao, H. (2000). An ANNs evolved by a new evolutionary system and its application. In Proceedings of the 39th IEEE conference on decision and control, pp. 3562-3563, New York: IEEE.

\* cited by examiner

PLASTIC NEURAL NETWORKS

CROSS-REFERENCE TO RELATED APPLICATIONS

This is a Non-Provisional Patent Application of U.S. Provisional Patent Application No. 62/162,032 filed May 15, 2015, entitled, "Plastic Neural Networks," the entirety of which is incorporated herein by reference.

BACKGROUND OF INVENTION

(1) Field of Invention

The present invention relates to a system for developing and implementing neural networks with adaptable weights and architectures and, more particularly, to a system for developing and implementing neural networks with adaptable weights and architectures through biologically-inspired methods.

(2) Description of Related Art

Increasing the capacity of autonomous systems to learn from their environment is of central importance to improving their performance in real-world environments, which are highly nonlinear and nonstationary. One of the key components to achieving this goal is developing and implementing processing and control mechanisms with adaptable structure in addition to modifiable parameters.

Neural networks store information in a highly distributed manner, and they process information in a massively parallel, decentralized manner. These characteristics are what give neural networks their useful properties, such as robustness to noise, generalization to novel stimuli, low power consumption, high information throughput, and graceful degradation of performance in the presence of damage. However, they also make it difficult to understand what information a network has learned, where/how it is stored, and what computations a network is performing. Any technique for modifying a neural network's architecture, especially if the modifications occur online, must account for these useful, but confounding approaches to representing and processing information.

Neural networks are a very promising avenue for implementing the type of enhanced learning abilities required of real-world autonomous agents. However, due to the massively distributed nature of information storage in neural networks, it tends to be very difficult to understand what information a network has learned and how it is stored. This, in turn, makes it hard to know how to modify network structure in a constructive way and avoid destroying useful information that has previously been learned.

There have been two primary thrusts in past work on neural network learning and optimization through network growth. The first class of methodologies fall under the umbrella of Evolutionary Computation, or closely related techniques such as Particle Swarm Optimization (see the List of Incorporated Literature References, Literature Reference Nos. 1, 2, 6, 8, 9, and 11). Such methods rely on the principles of natural evolution, such as randomness, fitness-based selection, recombination, and mutation. They incorporate a population of individuals, where an individual is typically an encoding of an entire neural network or a fraction of one. The second class of methods rely on the statistics and effects of neural activities to determine when and where new neurons should be added and/or old neurons should be removed (see Literature Reference Nos. 4, 5, 7, and 10). These measures typically involve characteristics, such as the variance in a neurons output, the correlation between the outputs of different neurons, and the sensitivity of network output on the activities of individual neurons.

What this and most similar methods for growing neural networks lack are principled approaches to increasing the likelihood that newly integrated network structure (neurons and connections) will become useful during the learning process, coupled with a means of competition among neurons to reduce information redundancy and isolate unnecessary network structure. Thus, a continuing need exists for biologically-inspired mechanisms that solve these challenges and, thus, pave the way for more robust online learning methods that utilize neural growth.

SUMMARY OF THE INVENTION

The present invention relates to a system for developing and implementing neural networks with adaptable weights and architectures and, more particularly, to a system for developing and implementing neural networks with adaptable weights and architectures through biologically-inspired methods. The system comprises one or more processors and a memory having instructions such that when the instructions are executed, the one or more processors perform multiple operations. The system receives inputs to be learned by a multi-layered spiking neural network, wherein the multi-layered spiking neural network comprises a plurality of neurons having weighted connections to one another. A first mechanism is implemented to adapt weights on the connections via competition among neurons using Hebbian learning, wherein activity levels of the neurons are stabilized to allow the multi-layered spiking neural network to learn the inputs. A second mechanism is implemented to increase a learning rate of a neuron over time using Hebbian learning. A third mechanism is implemented, wherein newly created neurons, representing new inputs, copy at least one synaptic structure of older neurons in the multi-layered spiking neural network. The first, second, and third mechanisms are used for continuous, online learning of the inputs to the multi-layered spiking neural network, resulting in learned inputs. An autonomous system uses the learned inputs to learn from its environment and perform tasks, such as classification and prediction.

In another aspect, the autonomous system makes a prediction regarding the environment based on the learned inputs.

In another aspect, neurons in the multi-layered spiking neural network that are characterized by consistently low spiking activity rates are removed due to suppression by neighboring neurons.

In another aspect, for a pair of neurons (i,j), the one or more processors further perform operations of determining whether neuron i connects to neuron j; if neuron i connects to neuron j, then determining whether both neuron i and neuron j have low spike rates; if both neuron i and neuron j do not have low spike rates, then determining whether both neuron i and neuron j have high spike rates; if both neuron i and neuron j have high spike rates, then increasing the weight on the connection between neuron i and neuron j by an amount dw, where dw represents the learning rate; and if both neuron i and neuron j do not have high spike rates, then decreasing the weight on the connection between neuron i and neuron j by an amount dw/2.

In another aspect, for each neuron i, having short term synaptic plasticity (STSP) parameters, at time t, the one or more processors further perform operations of shifting STSP parameters on every time-step to increase a tendency to spike among neurons that that have exhibited low spiking activity; determining whether neuron i has spiked; and if neuron i has spiked, then shifting its STSP parameters to decrease its tendency to spike.

In another aspect, the autonomous system is an autonomous vehicle.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
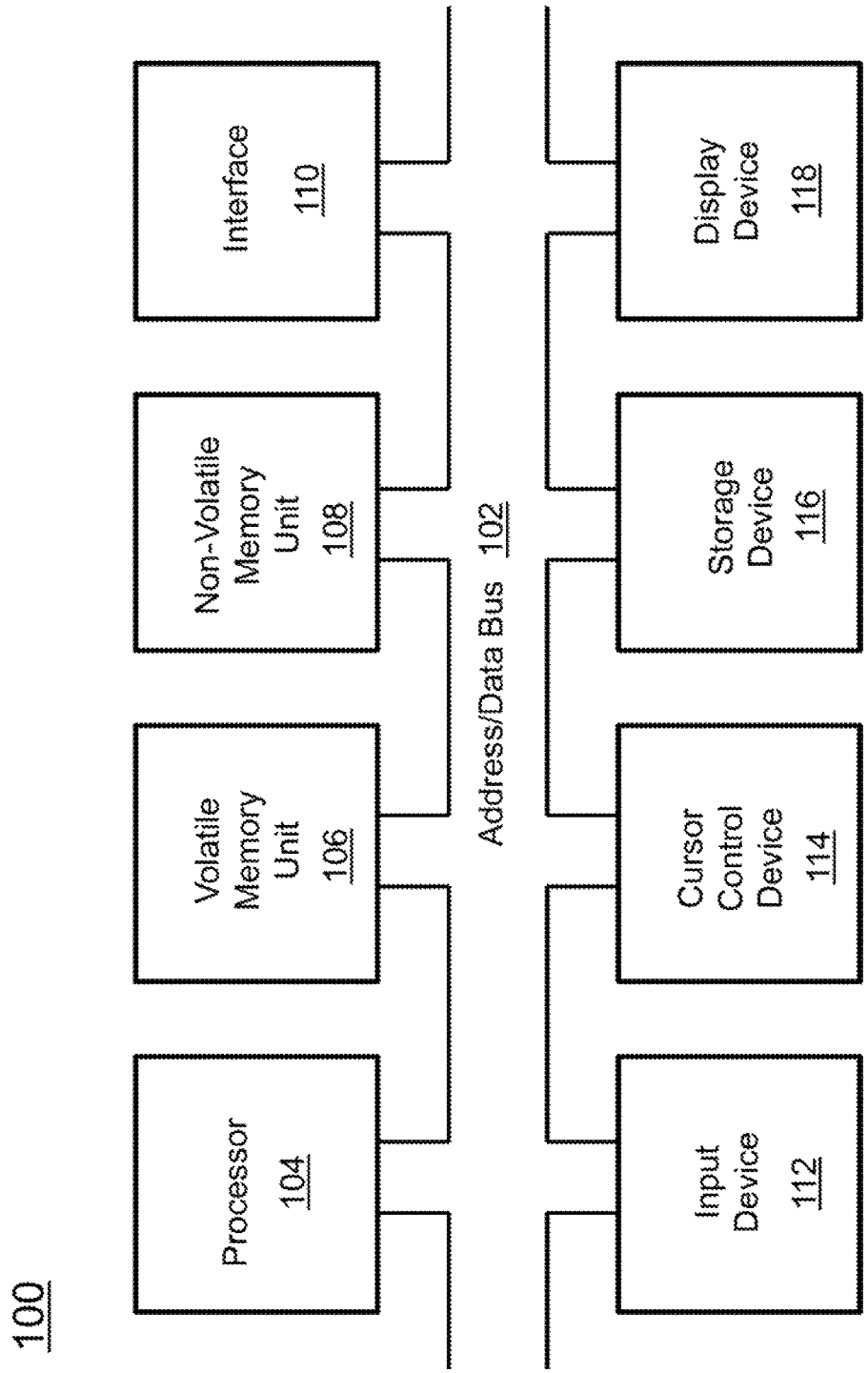
FIG. 1 is a block diagram depicting the components of a system for developing and implementing neural networks with adaptable weights and architectures according to various embodiments of the present disclosure.

The present invention relates to a system for developing and implementing neural networks with adaptable weights and architectures and, more particularly, to a system for developing and implementing neural networks with adaptable weights and architectures through biologically-inspired methods. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Following that is an introduction that provides an overview of the present invention. Finally, specific details of the present invention are provided to give an understanding of the specific aspects.

(1) List of Incorporated Literature References

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. Carvalho, M. and Ludermir, T. (2007). Particle swarm optimization of neural network architectures and weights. In Proceedings of the 7th international conference on hybrid intelligent systems (HIS '07) (pp. 336-339). New York: IEEE.
2. Chval, J. (2002). Evolving artificial neural networks by means of evolutionary algorithms with L-systems based encoding (Research Report). Prague, Czech Republic: Czech Technical University.
3. Islam M., Sattar, A., Amin, F., et al. (2009). A new adaptive merging and growing algorithm for designing artificial neural networks. IEEE Transactions On Systems, Man, and Cybernetics—Part B: Cybernetics, Vol. 39, No. 3, pp. 705-722.

4. Fahlman, S. and Lebiere, C. (1990). The cascade-correlation learning architecture. In D. S. Touretzky (Ed.), Advances in neural information processing systems II (pp. 524-532). San Francisco, Calif.: Morgan Kaufmann.
5. Frean, M. (1990). The upstart algorithm: A method for constructing and training feedforward neural networks. Neural Computation, 2, 198-209.
6. Genetic synthesis of modular neural networks. In S. Forest (Ed.), Proceedings of the 5th international conference on genetic algorithms (ICGA '93) (pp. 318-325). San Francisco, Calif.: Morgan Kaufmann.
7. Hassibi, B., Stork, D. and Wolff, G. (1993). Optimal brain surgeon and general network pruning. In Proceedings of the IEEE international conference on neural networks (ICNN '93), vol. 1, (pp. 293-299). New York: IEEE.
8. Kiranyaz, S., Ince, T., Yildirim, A. and Gabbouj, M. (2009). Evolutionary artificial neural networks by multi-dimensional particle swarm optimization. Neural Networks, 22, 1448-1462.
9. Kitano, H. (1990). Designing neural networks using genetic algorithms with graph generation system. Complex Systems, 4, 461-476.
10. Marchand, M., Golea, M. and Rujan, P. (1990). A convergence theorem for sequential learning in two-layer perceptrons. Europhysics Letters, 11(6), 487-492.
11. Zhang, C. and Shao, H. (2000). An ANNs evolved by a new evolutionary system and its application. In Proceedings of the 39th IEEE conference on decision and control (pp. 3562-3563). New York: IEEE.

(2) Principal Aspects

The present invention has three "principal" aspects. The first is a system for developing and implementing neural networks with adaptable weights and architectures. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. For example, the input device 112 may include one or more sensors, such as a camera for video or still images, a microphone, or a neural sensor. Other example input devices 112 may include an accelerometer, a GPS sensor, or a gyroscope.

In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
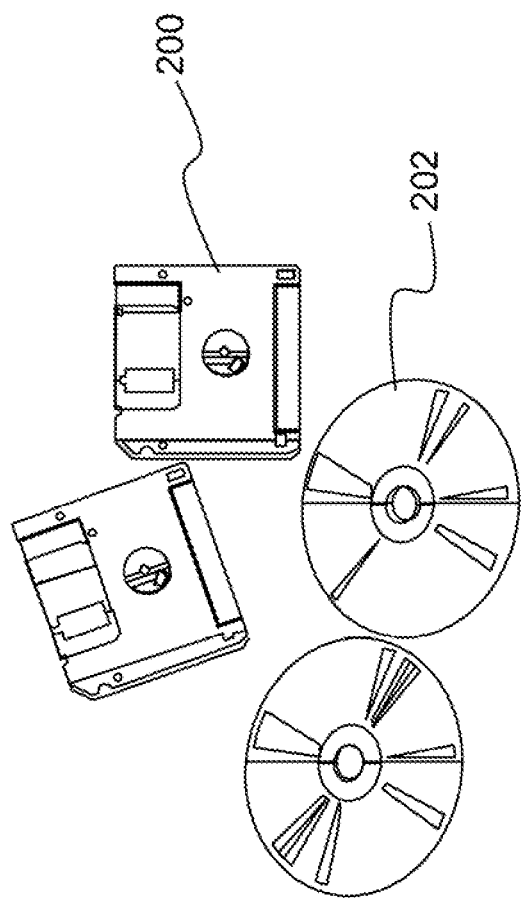
FIG. 2 is an illustration of a computer program product according to various embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

There have been two primary thrusts in past work on neural network learning and optimization through network growth. The first class of methodologies fall under the umbrella of Evolutionary Computation, or closely related techniques such as Particle Swarm Optimization (see Literature Reference Nos. 1, 2, 6, 8, 9, and 11). Such methods rely on the principles of natural evolution, such as randomness, fitness-based selection, recombination, and mutation. They incorporate a population of individuals, where an individual is typically an encoding of an entire neural network or a fraction of one. The second class of methods rely on the statistics and effects of neural activities to determine when and where new neurons should be added and/or old neurons should be removed (see Literature Reference Nos. 4, 5, 7, and 10). These measures typically involve characteristics, such as the variance in a neurons output, the correlation between the outputs of different neurons, and the sensitivity of network output on the activities of individual neurons.

The first class of methods ignore the question of why a particular network architecture is effective or which subcomponents are useful. The second class of methods attempt to delve deeper into which components (neurons and connections) are useful and which are not, but typically ignore or take relatively unsophisticated approaches as to how to best integrate, destroy, and modify network structure. In contrast, and as described below, the system according to embodiments of the present disclosure makes use of mechanisms present during the development of biological neural networks to give networks the ability to continually adapt their architectures as dictated by the environment while mitigating the common problems of information destruction and disruption to computing processes within the network. Furthermore, while the importance of having neurons compete for activity and of structure copying has been considered in isolation in past related work, the present invention brings these mechanisms together and demonstrates that they are important not just in their own right, but also in relation to the life cycle of neurons.

(4) Specific Details of the Invention

Described herein is a methodology for adapting the weights and growing the architectures of neural networks through a process of self-organization. It consists of a synthesis of biologically-inspired methods that are central to the effectiveness of the system according to some embodiments of the present disclosure in that they promote the learning of new information by the network while limiting the destruction of information that is already stored in the network. Furthermore, the methods enhance the ability of the network to generalize its behavior to novel inputs.

Figure 3:
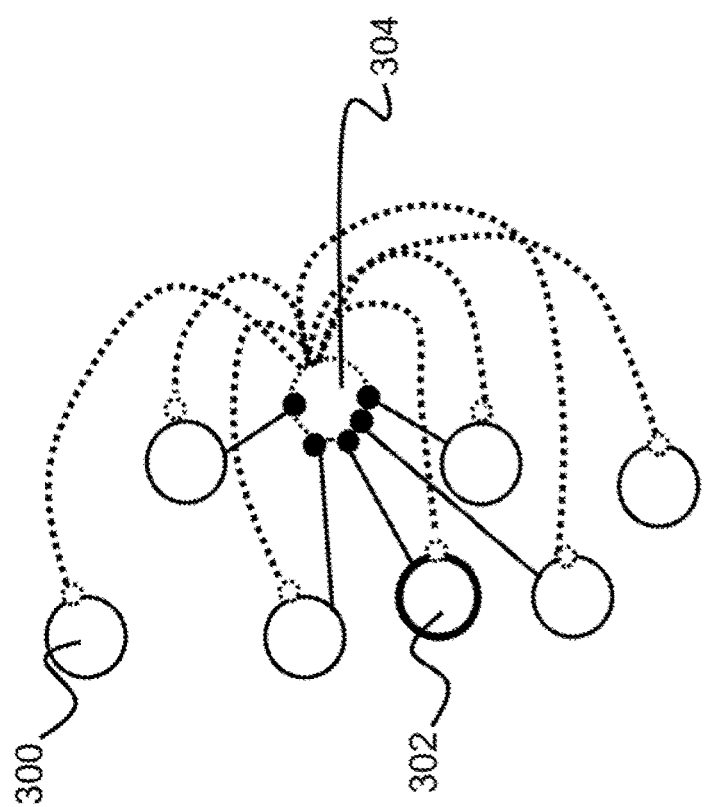
FIG. 3 is an illustration of a possible implementation of the competitive mechanism among neurons according to various embodiments of the present disclosure.

The first mechanism is the competition among neighbor neurons for activity. The purpose of this mechanism is two-fold. First, it forces neurons to represent different information. Second, it acts as a way of weeding out excess neurons that are not useful. Such neurons are characterized by consistently low activity rates due to suppression by neighbor neurons. FIG. 3 illustrates a possible implementation of the competitive mechanism among neurons. Excitatory neurons are shown as unbolded solid circles 300 and a bold solid circle 302, and the dashed circle 304 represents an inhibitory neuron. The competitive mechanism is manifest as a negative feedback loop. Each excitatory neuron 300 and 302 connects to an inhibitory neuron 304 that sends connections back to each excitatory neuron 300 and 302. When an excitatory neuron 302 exhibits a firing rate that is significantly greater than that of its neighbors, the feedback connections from the inhibitory neuron 304 suppresses the activity of other excitatory neurons 300.

The second mechanism is the neuron life cycle. Under this process, a newly created neuron initially exhibits a high degree of excitability, which results in high learning rates on the connections to the new neuron. At the same time in the life cycle, the new neuron has little influence on the activities of other neurons in the network and, thus, has minimal impact on the network dynamics. As the neuron ages, its excitability decreases; however, its ability to impact the activities of the neurons it connects to increases, as do the learning rates on the connections it sends out. This mechanism limits the impact that a newly created neuron has on the memory and computations of the network precisely when the neuron is still a new component and is, thus, unlikely to be representing useful information. However, during this phase, the high excitability of the new neuron accelerates the rate at which it comes to transmit information. The simultaneous transition from low to high learning rate follows right along with the neuron's increased capacity to represent information, thus enhancing the neuron's ability to transmit useful information.

Figure 4:
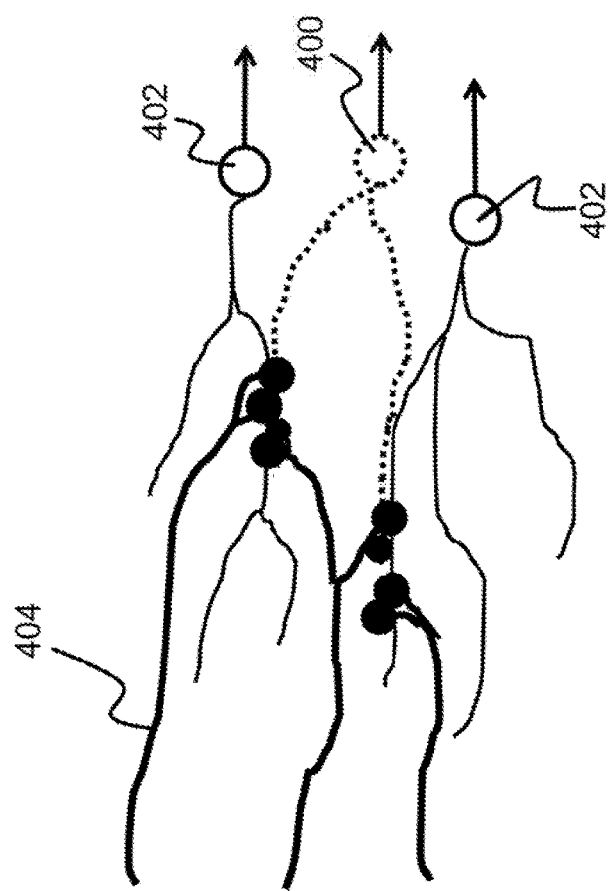
FIG. 4 is an illustration of the synaptic structure copying mechanism according to various embodiments of the present disclosure.

The third mechanism involves having new neurons copy some of the synaptic structures of older neurons. FIG. 4 illustrates the synaptic structure copying mechanism employed by the system according to some embodiments. The newly created neuron 400 is depicted as a dashed circle, and its input connections are depicted by dashed lines. The older neurons 402 are depicted as solid circles, and their input connections are depicted by solid lines. The bold lines 404 represent output connections coming from neurons that are not visible in the figure. The newly created neuron 400 can be seen to share some of the connections that synapse on the older neurons 402, represented by the bold lines 404. This mechanism has two primary functions. First, it increases the likelihood that a newly created neuron will transmit at least some useful information prior to adaptation of its pre-synaptic weights. This, in turn, increases the likelihood that the neuron will survive (i.e., avoid being pruned). Second, it promotes the combining of information in a novel and possibly useful manner.

(4.1) The Plastic Networks Embodiment

In one embodiment, the invention is implemented as a class of recurrent neural network models that incorporate excitatory and inhibitory leaky-integrate-and-fire spiking neurons. These neural networks are referred to as plastic networks. Plastic networks consist of three distinct layers of neurons. The input layer accepts input to the network; the hidden/internal layer forms the network's internal representations of its inputs; and the output layer produces the network's outputs and performs additional processing. The weights on the connections are trained using Hebbian (correlation) learning, which is a completely local and biologically feasible learning rule. Plastic networks implement two of the three aforementioned biologically-inspired mechanisms that are of central importance to endowing the networks with the ability to rapidly learn information using only Hebbian learning. Specifically, they implement competition for activity and the neuron life-cycle. A software-based testbed was created by the Applicants for implementing and testing plastic networks, and this testbed was used to demonstrate that the networks are able to solve a classification problem. The testbed was written in MATLAB.

Figure 5:
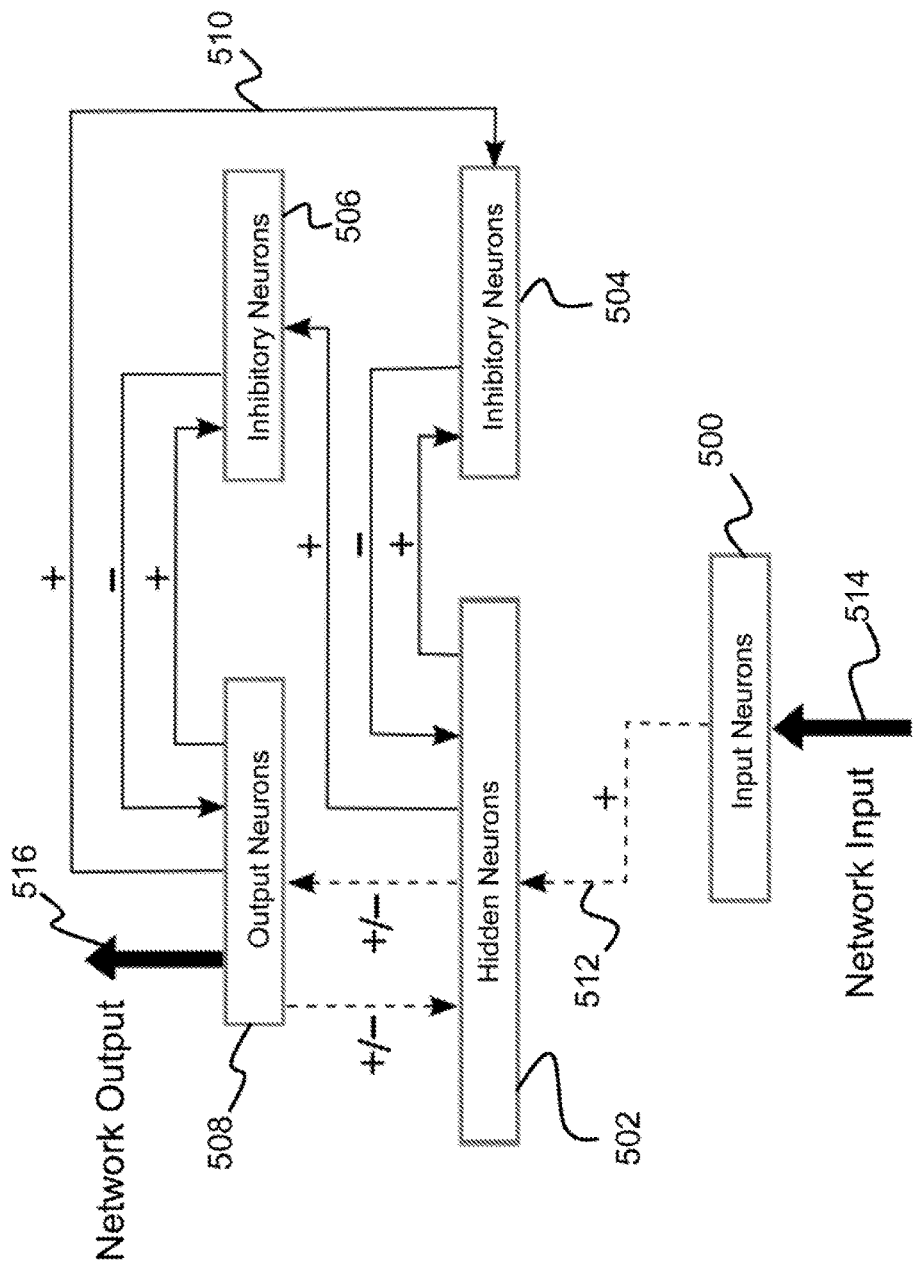
FIG. 5 is an illustration of the plastic networks architecture according to various embodiments of the present disclosure.

FIG. 5 depicts a plastic network architecture. The blocks indicate groups of neurons (e.g., input neurons 500, hidden neurons 502, inhibitory neurons 504 and 506, output neurons 508), and the arrows (solid arrows 510, dashed arrows 512) between blocks represent the existence of connections between them. Network input 514 is input to the input neurons 500, and network output 516 is output from the output neurons 508. Solid arrows 510 indicate connections with weights that are fixed, while dashed arrows 512 represent connections with weights that are adaptable through Hebbian learning. The "+", "−", and "+/−" symbols indicate whether the weights are positive, negative, or permitted to be either positive or negative, respectively. The competition for activity mechanism is implemented as negative feedback loops, and occurs both within the hidden layer of hidden neurons 502 and output layer of output neurons 508 and between these layers. It was determined that this mechanism is essential for stabilizing the neurons' activity levels, thus allowing the network to learn.

The neuron life cycle mechanism is implemented using two distinct processes. The first process involves the scalar learning rate parameter used in the Hebbian learning algorithm. In plastic networks this parameter increases over time in order to facilitate the acquisition of new information throughout the learning period of the network. In most previous work where a learning rate parameter has been explicitly varied during the learning process, the parameter decreases over time providing a gradual transition between exploration early in the training period and exploitation as training nears completion. However, most previous work on applying neural networks to classification problems does not consider multi-layer spiking networks that strictly utilize Hebbian learning for training. From experimental studies, it was found that increasing the learning rate over time was an essential component of getting this class of neural networks to solve classification problems.

Figure 6:
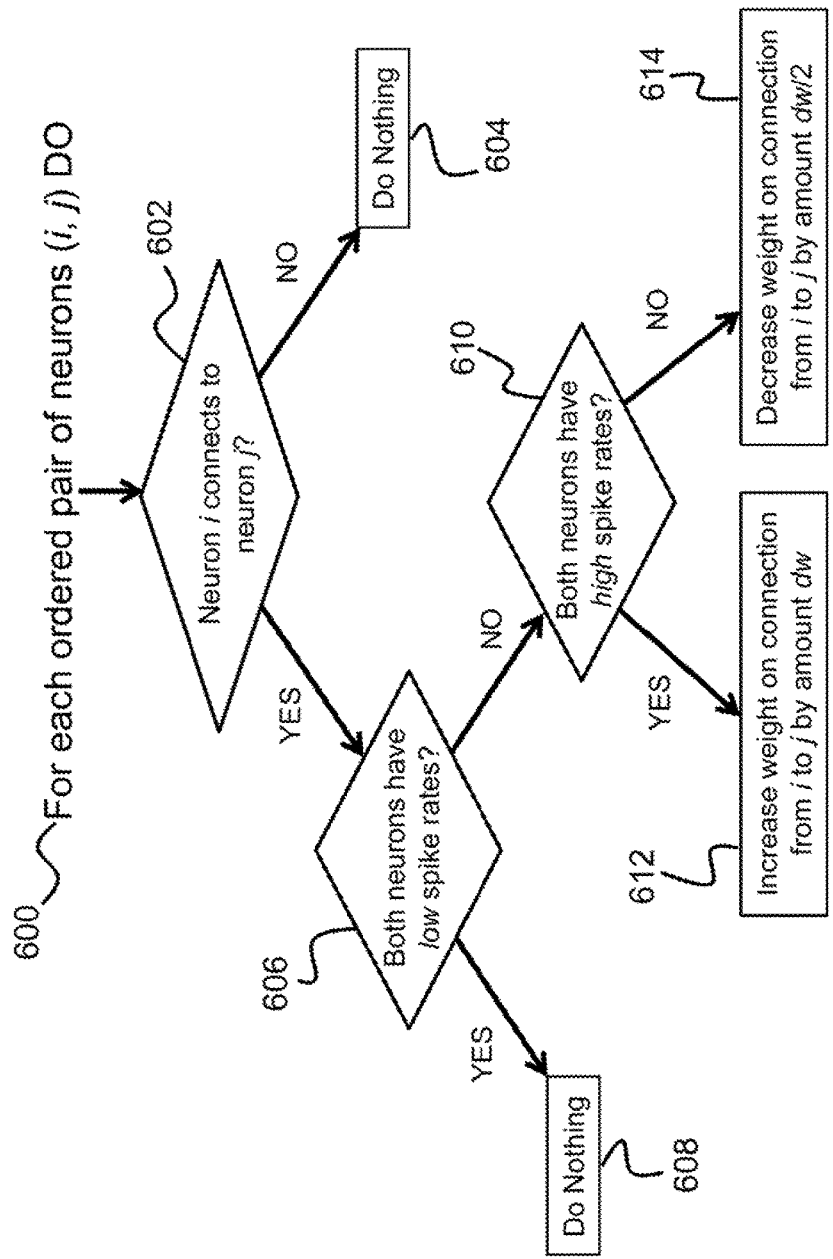
FIG. 6 is an illustration of the Hebbian learning procedure employed by plastic networks according to various embodiments of the present disclosure.

The Hebbian learning procedure is illustrated in FIG. 6. This is a correlation-based learning rule and is applied to every adaptable connection in the network on each time-step. It is the learning rate dw that is adapted as a function of time. For each ordered pair of neurons (i,j) 600, the system determines whether neuron i connects to neuron j 602. If no, do nothing 604. If yes, a determination is made whether both neurons have low spike rates 606. If yes, do nothing 608. If no, a determination is made whether both neurons have high spike rates 610. If yes, the weight on the connection between i and j is increased by an amount dw (element 612). If no, the weight on the connection between i and j is decreased by an amount dw/2 (element 614).

The second process involved in implementing the neuron life cycle is based on a mechanism known to occur in biological neural networks referred to as Short Tem Synaptic Plasticity (STSP). This form of plasticity produces short-term changes in the ability of pre-synaptic neurons to elicit responses from post-synaptic neurons. This mechanism provides continued variation of neuronal excitability throughout the learning process and, in doing so, "primes" different sets of connections to rapidly encode information when there is a shift in the target mapping. It also has a longer term effect on the excitability of neurons. Specifically, a neuron's excitability tends to decrease as it ages.

The spiking neurons utilized by plastic networks are of the leaky-integrate-and-fire type. At each discrete time $t \in \mathbb{N}$, a neuron is defined by its input current and membrane voltage. Let $I(t)$ be the input current to a neuron and $V(t)$ its membrane voltage at discrete time $t \in \mathbb{N}$. These variables are updated according to the equations:

$$V(t+1) = \tau V(t) + I(t), \text{ and}$$

$$I(t+1) = I(t) + s_r s_u \left( s_c \sum_j \delta_j(t) w_j + \sum_k \delta_k(t) w_k \right),$$

where $\tau, s_r, s_u, s_c \in \mathbb{R}^+$, $w_j, w_k \in \mathbb{R}$ are weights on connections from pre-synaptic neurons, and $\delta_j(t), \delta_k(t) = 1$ if the corresponding pre-synaptic neurons fired an action potential (spiked) at time t and are 0 otherwise. The first summation is over weights $w_j$ that are adaptable, whereas the second summation is over weights $w_k$ that are fixed. The scaling parameter $s_c$ is specific to each neuron and helps keep the average neuronal activity of the network at a level acceptable for learning and computation. At each time-step t, and for every neuron, $s_c$ is increased by an amount $\Delta$up. However, if a neuron spiked at time-step t, then its $s_c$ parameter is reduced by an amount $\Delta$down, where $\Delta$down>$\Delta$up. The parameters $s_r$ and $s_u$ are specific to each neuron, and implement the effects of Short-Term Synaptic Plasticity (STSP). At every time-step, and for every neuron, these parameters are updated according to the following:

$$s_r = 1 - d_r(1-s_r),$$

$$s = d_f - d_u(d_f - s_u),$$

where $d_r$, $d_u$, $d_f \in \mathbb{R}^+$ are constants. Additionally, if a neuron spiked on the current time-step, then its STSP parameters are further updated according to the following:

$$s_r = s_r(1-s_u),$$

$$s_u = s_u + d_f(1-s_u).$$

Figure 7:
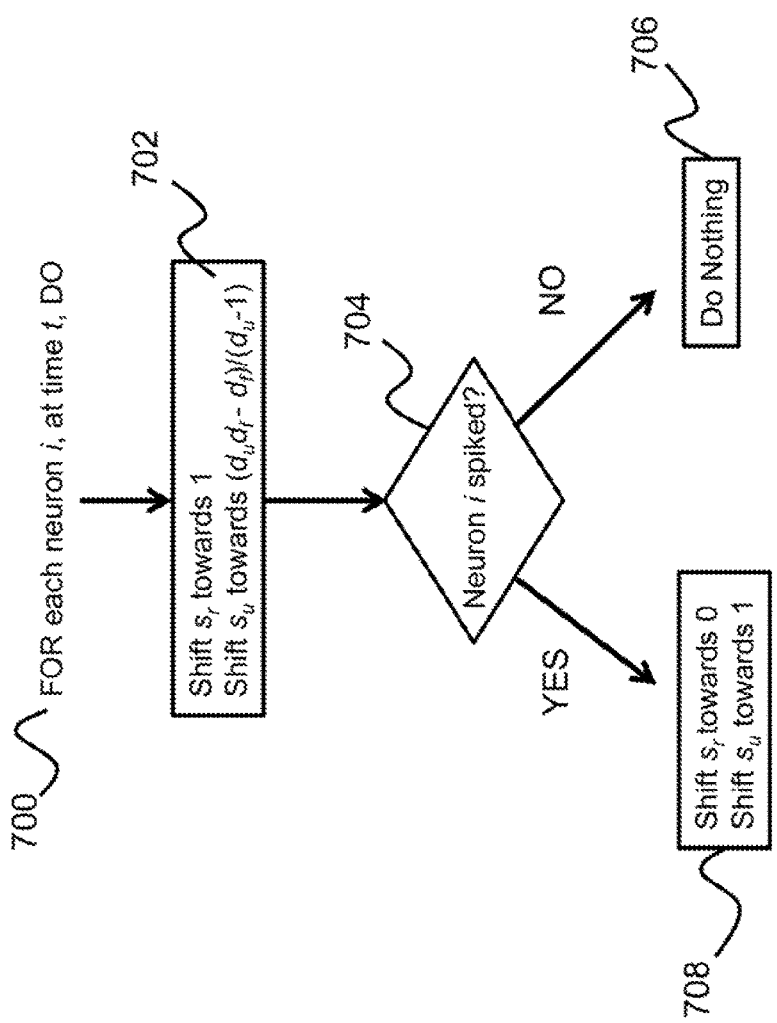
FIG. 7 is an illustration of the procedure that implements Short Term Synaptic Plasticity (STSP) according to various embodiments of the present disclosure.

The implementation of the Short Term Synaptic Plasticity procedure is diagrammed in FIG. 7. For each neuron i, at time 1700, each neuron's STSP parameters are shifted on every time-step 702. Specifically, $s_r$ is shifted towards 1, and $s_u$ is shifted towards $(d_u d_f - d_f)/(d_u - 1)$. This has the effect of increasing the tendency to spike among neurons that have exhibited low activity (few spikes). A determination is made regarding whether neuron i has spiked 704. If not, do nothing 706. On the other hand, if a neuron i does spike, then its STSP parameters are shifted in such a way that its tendency to spike is decreased 708. Specifically, $s_r$ is shifted towards 0, and $s_u$ is shifted towards 1. These two effects counterbalance each other and help to maintain homeostasis of activity within the network. This homeostasis helps maintain the network's activity at a level that is conducive to learning throughout the training process, which is particularly important when the target mapping is non-stationary.

(4.2) Experimental Results

The testbed was used to determine if plastic networks could effectively learn a classification problem. The problem consisted of a set of measurements (network inputs), each of which belonged to exactly one of three possible classes. The plastic networks were tasked with learning to correctly classify the measurements they saw as input. During the learning phase, an input was presented to the network and activity representing the correct output (class) was clamped onto the network's output nodes. At this point the network dynamics were permitted to evolve for a predefined number of iterations, during which time Hebbian learning updated the weights on the trainable connections. Once the learning phase was completed, the performance of the network was tested by presenting it with inputs belonging to different classes and requiring the network to output values corresponding to the correct classes. It was found that, most of the time, the networks were able to learn to correctly classify their inputs. The results of one of these experiments is shown in FIG. 8A.

Figure 8A:
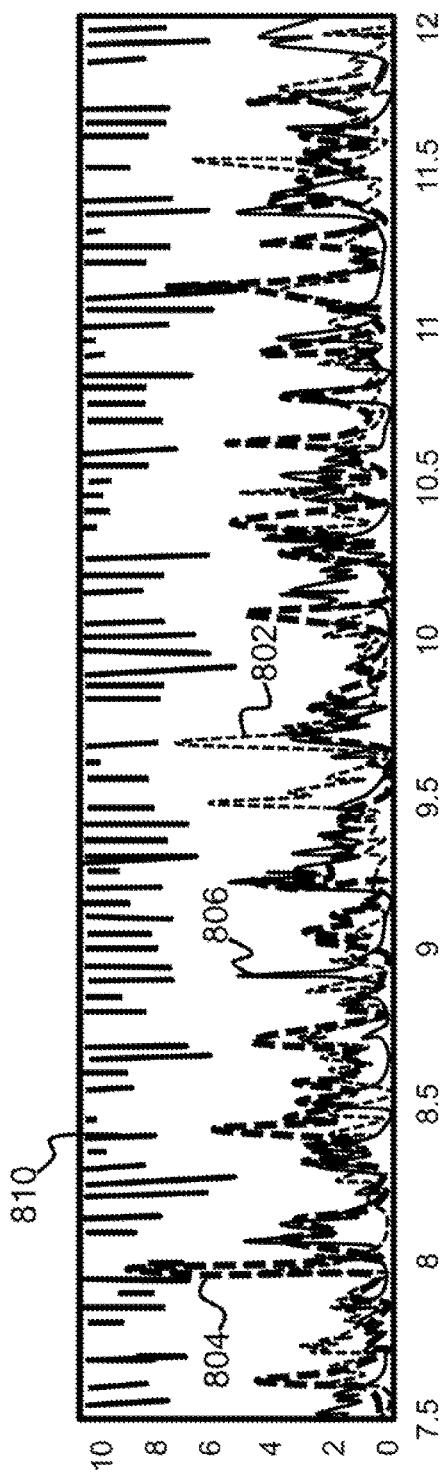
FIG. 8A is an illustration of classification results of a plastic neural network according to various embodiments of the present disclosure.
Figure 8B:
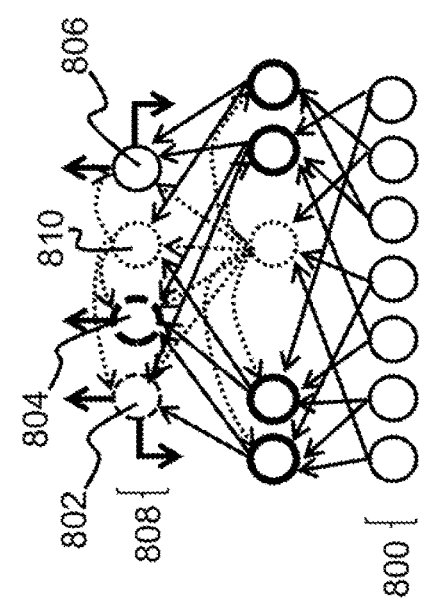
FIG. 8B is an illustration of an example of a plastic network used for classification according to various embodiments of the present disclosure.

FIG. 8B depicts an example of a plastic network used for classification. The bottom layer 800 is where input enters the network. The network has three output neurons 802, 804, and 806 in the top most layer 808. An inhibitory neuron 810 in the top most layer 808 does not produce network output. The activity level of input neurons 802 in FIG. 8A is interpreted as being a vote of confidence that the current input belongs to that specific class. The activity levels of input neurons 804 and 806 are interpreted in an analogous manner.

In FIG. 8A, the x-axis of the graph represents network inputs that belong to one of three classes, corresponding to the three output neurons 802, 804, and 806. The y-axis represents the activity level of the output neurons. The spikes on the top of the graph indicate the activity level of the inhibitory neuron 810. For each network input, all three output neurons exhibit some degree of activity. The current network input is interpreted as belonging to the class that is represented by the output neuron with greatest activity level. It can be seen in the graph that, for any given network input, the output neuron with the greatest activity level corresponds to the correct input class.

From experimental studies, it was determined that without the biologically-inspired mechanisms of competition for activity and neuron life cycle, the networks were unable to learn to solve the classification task. Furthermore, the Applicants are not aware of any past work in which multi-layer neural networks with spiking neurons have been successfully trained to solve classifications problems using only Hebbian learning. It appears that plastic networks are unique in this sense, and that the biologically-inspired mechanisms that form the basis of the present invention play a vital role in this capability.

In one embodiment, the present invention is implemented using neuromorphic hardware, which can implement inhibitory and excitatory spiking neurons that can undergo Hebbian learning, which is needed for the plastic networks according to embodiments of the present disclosure. Additionally, neuromorphic hardware can implement mechanisms for changing the excitability of one neuron's response to another neuron's output on short timescales.

In summary, the system according to embodiments of the present disclosure is a flexible framework for developing and implementing neural networks with adaptable weights and architectures. It provides a more principled scheme for simultaneously adapting the weighs and architecture of neural networks that consist of either spiking or rate-coded neurons. The invention described herein is based on biologically-inspired methods that allow a neural network to self-organize its weights and architecture through purely data-driven processes. That is, the network adapts as dictated by its interactions with the environment and the resultant activity within the network. Growth based on self-organization reduces the need for oversight and direct manipulation of network development and a priori knowledge about the computing and memory requirements of the network. The mechanisms of network development underlying the system are specifically designed to mitigate disruption to network operation and memory, while taking advantage of previously learned knowledge to generalize network behavior to unexpected environmental conditions. In this way, the system provides a unique means of continuous, online adaptation of network architecture.

The invention described herein has applications in machine learning and prediction. It has applications in autonomous systems and potentially further applications in fields that require classic machine learning techniques. For example, it could be used for online learning in adaptive control systems deployed in autonomous and semi-autonomous automobiles and unmanned vehicles. The continuous learning capabilities and adaptability of the system according to various embodiments would make it particularly useful in complex, dynamic, adversarial environments, such as the domains of cybersecurity and electronic warfare. It also holds promise for problems that require prediction and extraction of salient features from massive data sets. For example, the invention could prove very useful in determining vehicle maintenance requirements and predicting component failures.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. An adaptive control system deployed in a vehicle having a plurality of vehicle components adaptive control system comprising:
   one or more processors and a non-transitory computer-readable medium having executable instructions encoded thereon such that when executed, the one or more processors perform an operation of:
      receiving inputs to be learned by a multi-layered spiking neural network, wherein the multi-layered spiking neural network comprises a plurality of neurons having weighted connections to one another,
      wherein the multi-layered spiking neural network utilizes negative feedback loops to force neurons to compete for activity;
      continuously learning the inputs to the multi-layered spiking neural network online, resulting in learned inputs, wherein continuous learning of the inputs comprises:
         adapting weights on the connections via competition among neurons using Hebbian learning, wherein activity levels of the neurons are stabilized to allow the multi-layered spiking neural network to learn the inputs;
         increasing a learning rate of a neuron over time using Hebbian learning, wherein each neuron is characterized by an initial period of excitability and an initial learning rate which transitions to a subsequent period of excitability that is lower than the initial period and a subsequent learning rate that is higher than the initial learning rate as the neuron ages; and
         newly creating neurons, representing new inputs, copying at least one synaptic structure of older neurons in the multi-layered spiking neural network;
      based on the learned inputs, performing a classification task on a new input in the vehicle's environment; and
      based on classification of the new input, generating at least one of a vehicle maintenance requirement related to a vehicle component and a prediction of failure of a vehicle component.

2. The adaptive control system as set forth in claim 1, wherein the one or more processors further perform an operation of removing neurons in the multi-layered spiking neural network that are characterized by consistently low spiking activity rates due to suppression by neighboring neurons.

3. The adaptive control system as set forth in claim 1, wherein for a pair of neurons (i,j), the one or more processors further perform operations of:
   determining whether neuron i connects to neuron j;
   if neuron i connects to neuron j, then determining whether both neuron i and neuron j have low spike rates;
   if both neuron i and neuron j do not have low spike rates, then determining whether both neuron i and neuron j have high spike rates;
   if both neuron i and neuron j have high spike rates, then increasing the weight on the connection between neuron i and neuron j by an amount dw, where dw represents the learning rate; and
   if both neuron i and neuron j do not have high spike rates, then decreasing the weight on the connection between neuron i and neuron j by an amount dw/2.

4. The adaptive control system as set forth in claim 1, wherein for each neuron i, having short term synaptic plasticity (STSP) parameters, at time t, the one or more processors further perform operations of:
   shifting STSP parameters on every time-step to increase a tendency to spike among neurons that that have exhibited low spiking activity;
   determining whether neuron i has spiked; and
   if neuron i has spiked, then shifting its STSP parameters to decrease its tendency to spike.

5. A computer-implemented method for implementing an adaptive control system deployed in a vehicle having a plurality of vehicle components, comprising:
   an act of causing one or more processors to execute instructions stored on a non-transitory memory such that upon execution, the one or more processors perform operations of:
      receiving inputs to be learned by a multi-layered spiking neural network, wherein the multi-layered spiking neural network comprises a plurality of neurons having weighted connections to one another,
      wherein the multi-layered spiking neural network utilizes negative feedback loops to force neurons to compete for activity;
      continuously learning the inputs to the multi-layered spiking neural network online, resulting in learned inputs, wherein continuous learning of the inputs comprises:
         adapting weights on the connections via competition among neurons using Hebbian learning, wherein activity levels of the neurons are stabilized to allow the multi-layered spiking neural network to learn the inputs;
         increasing a learning rate of a neuron over time using Hebbian learning, wherein each neuron is characterized by an initial period of excitability and an initial learning rate which transitions to a subsequent period of excitability that is lower than the initial period and a subsequent learning rate that is higher than the initial learning rate as the neuron ages; and
         newly creating neurons, representing new inputs, copying at least one synaptic structure of older neurons in the multi-layered spiking neural network;
      based on the learned inputs, performing a classification task on a new input in the vehicle's environment; and
      based on classification of the new input, generating at least one of a vehicle maintenance requirement related to a vehicle component and a prediction of failure of a vehicle component.

6. The method as set forth in claim 5, wherein the one or more processors further perform an operation of removing neurons in the multi-layered spiking neural network that are characterized by consistently low spiking activity rates due to suppression by neighboring neurons.

7. The method as set forth in claim 5, wherein for a pair of neurons (i,j), the one or more processors further perform operations of:
   determining whether neuron i connects to neuron j;
   if neuron i connects to neuron j, then determining whether both neuron i and neuron j have low spike rates;
   if both neuron i and neuron j do not have low spike rates, then determining whether both neuron i and neuron j have high spike rates;
   if both neuron i and neuron j have high spike rates, then increasing the weight on the connection between neuron i and neuron j by an amount dw, where dw represents the learning rate; and
   if both neuron i and neuron j do not have high spike rates, then decreasing the weight on the connection between neuron i and neuron j by an amount dw/2.

8. The method as set forth in claim 5, wherein for each neuron i, having short term synaptic plasticity (STSP) parameters, at time t, the one or more processors further perform operations of:
   shifting STSP parameters on every time-step to increase a tendency to spike among neurons that that have exhibited low spiking activity;
   determining whether neuron i has spiked; and
   if neuron i has spiked, then shifting its STSP parameters to decrease its tendency to spike.

9. A computer program product for implementing an adaptive control system deployed in a vehicle having a plurality of vehicle components, the computer program product comprising:
   computer-readable instructions stored on a non-transitory computer-readable medium that are executable by a computer having one or more processors for causing the processor to perform operations of:
      receiving inputs to be learned by a multi-layered spiking neural network, wherein the multi-layered spiking neural network comprises a plurality of neurons having weighted connections to one another,
      wherein the multi-layered spiking neural network utilizes negative feedback loops to force neurons to compete for activity;
      continuously learning the inputs to the multi-layered spiking neural network online, resulting in learned inputs, wherein continuous learning of the inputs comprises:
      adapting weights on the connections via competition among neurons using Hebbian learning, wherein activity levels of the neurons are stabilized to allow the multi-layered spiking neural network to learn the inputs;
      increasing a learning rate of a neuron over time using Hebbian learning, wherein each neuron is characterized by an initial period of excitability and an initial learning rate which transitions to a subsequent period of excitability that is lower than the initial period and a subsequent learning rate that is higher than the initial learning rate as the neuron ages; and
      newly creating neurons, representing new inputs, copying at least one synaptic structure of older neurons in the multi-layered spiking neural network;
      based on the learned inputs, performing a classification task on a new input in the vehicle's environment; and
      based on classification of the new input, generating at least one of a vehicle maintenance requirement related to a vehicle component and a prediction of failure of a vehicle component.

10. The computer program product as set forth in claim 9, further comprising instructions for causing the one or more processors to perform an operation of removing neurons in the multi-layered spiking neural network that are characterized by consistently low spiking activity rates due to suppression by neighboring neurons.

11. The computer program product as set forth in claim 9, wherein for a pair of neurons (i,j), the computer program product further comprises instructions for causing the one or more processors to perform operations of:
   determining whether neuron i connects to neuron j;
   if neuron i connects to neuron j, then determining whether both neuron i and neuron j have low spike rates;
   if both neuron i and neuron j do not have low spike rates, then determining whether both neuron i and neuron j have high spike rates;
   if both neuron i and neuron j have high spike rates, then increasing the weight on the connection between neuron i and neuron j by an amount dw, where dw represents the learning rate; and
   if both neuron i and neuron j do not have high spike rates, then decreasing the weight on the connection between neuron i and neuron j by an amount dw/2.

12. The computer program product as set forth in claim 9, wherein for each neuron i, having short term synaptic plasticity (STSP) parameters, at time t, the computer program product further comprises instructions for causing the one or more processors to perform operations of:
   shifting STSP parameters on every time-step to increase a tendency to spike among neurons that that have exhibited low spiking activity;
   determining whether neuron i has spiked; and
   if neuron i has spiked, then shifting its STSP parameters to decrease its tendency to spike.

* * * * *